United States Patent
Hung et al.

(10) Patent No.: US 6,669,520 B2
(45) Date of Patent: Dec. 30, 2003

(54) METHOD OF FABRICATING AN LC PANEL

(75) Inventors: Chin-Lung Hung, Hsin-Chu (TW); Charlie Han, Hsin-Chu Hsien (TW); Wei-Hsiao Chen, Chin-Men Hsien (TW)

(73) Assignee: United Microelectronics Corp., Hsin-Chu (TW)

( * ) Notice: Subject to any disclaimer, the term of this patent is extended or adjusted under 35 U.S.C. 154(b) by 146 days.

(21) Appl. No.: 09/682,550

(22) Filed: Sep. 19, 2001

(65) Prior Publication Data

US 2003/0054722 A1 Mar. 20, 2003

(51) Int. Cl.[7] .................................................. H01J 9/24
(52) U.S. Cl. .............................. 445/24; 445/22; 445/23; 445/25; 445/26; 445/40; 313/581; 313/584; 313/586
(58) Field of Search .............................. 445/24, 25, 26, 445/23, 27, 40, 45, 66; 313/586, 582, 581, 584

(56) References Cited

U.S. PATENT DOCUMENTS

| | | | | |
|---|---|---|---|---|
| 5,519,520 A | * | 5/1996 | Stoller | |
| 5,659,378 A | * | 8/1997 | Gessel | |
| 5,723,945 A | * | 3/1998 | Schermerhorn | |
| 5,952,680 A | * | 9/1999 | Strite | |
| 6,052,168 A | * | 4/2000 | Nishida et al. | |
| 6,400,423 B1 | * | 6/2002 | French | |
| 6,428,377 B1 | * | 8/2002 | Choi | |
| 6,439,943 B1 | * | 8/2002 | Aoki et al. | |

* cited by examiner

Primary Examiner—Dean A. Reichard
Assistant Examiner—Nguyen T. Ha
(74) Attorney, Agent, or Firm—Winston Hsu

(57) ABSTRACT

A backplane with multiple arrayed electrodes positioned on the backplane is provided in a method of fabricating a liquid crystal (LC) panel. The method begins with coating an alignment layer on the backplane. By performing a rubbing process, multiple alignment trenches are formed on the alignment layer. A photoresist layer is then formed on the alignment layer. By performing a lithography process, both a side frame, having at least one slit, and multiple photoresist spacers(PR spacers) are formed on the alignment layer. A gasket seal is coated on the side frame and the multiple PR spacers. By performing a lamination process, a transparent conductive layer is laminated on the backplane. A liquid crystal filling (LC filling) processis then performed to fill a cell gap between the backplane and the transparent conductive layer with liquid crystal. Finally, an end sealing process is performed to seal the slit.

18 Claims, 4 Drawing Sheets

METHOD OF FABRICATING AN LC PANEL

BACKGROUND OF THE INVENTION

1. Field of the Invention

The present invention relates to a method fabricating a liquid crystal (LC) panel, and more specifically, to a method of fabricating an LC panel with both a frame and multiple photoresist spacers (PR spacers) formed on an alignment layer of the LC air, panel, so as to prevent spacer collapse.

2. Description of the Prior Art

A thin film transistor liquid crystal display (TFT-LCD) utilizes thin film transistors arranged in a matrix to switch appropriate electrical elements such as capacitors and pads. The electrical elements subsequently drive liquid crystal pixels in the production of brilliant images. The conventional TFT-LCD element comprises of a transparent substrate over which thin film transistors, pixel electrodes, orthogonal scan lines and data lines are positioned. A color filter substrate and liquid materials fill the space between the transparent substrate and the color filter substrate. The TFT-LCD is characterized by its portability, low power consumption and low radiation emission; thus, it is widely used in various portable information products such as notebooks, personal data assistants (PDA), etc. Moreover, TFT-LCDs are increasingly replacing the CRT monitors in desktop computers.

Please refer to FIG. 1 to FIG. 5 of cross-sectional views of fabricating a liquid crystal (LC) panel according to the prior art. As shown in FIG. 1, a backplane 10 comprises multiple arrayed electrodes (not shown) positioned on the backplane 10. The method begins with coating an alignment layer 12 on the backplane 10. As shown in FIG. 2, a rubbing process is performed to form multiple alignment trenches 14 on the alignment layer 12. Normally, the backplane 10 is a silicon backplane, and the rubbing process is performed on a surface of the alignment layer 12 and utilizes a rubbing cloth.

As shown in FIG. 3, multiple spacer balls 16, composed of glass, are then sprayed on the alignment layer 12, wherein a distance between two adjacent spacer balls 16 ranges from 200 to 400 microns based on the product requirement. A mixture comprising a gasket seal and multiple spacer balls 16 is then coated on a border of the backplane 10 to form a side frame 18, comprising at least one slit 20, to surround both the multiple electrodes and the multiple PR spacers 16.

As shown in FIG. 4, a curing process is performed to reinforce hardnesses of both the PR spacers 16 and the side frame 18. A gasket seal is then coated on the side frame 18 and the multiple PR spacers 16. By performing a lamination process, a transparent conductive layer 22, comprising indium tin oxide (ITO),and a transparent glass (not shown) are laminated, in order, on the backplane 10.

As shown in FIG. 5, a liquid crystal filling (LC filling) process is then performed to fill a cell gap between the backplane 10 and the transparent conductive layer 22 with liquid crystal. Finally, an end sealing process is performed to seal the slit, and a realignment process is performed after the end sealing process.

As previously described, multiple spacer balls 16 are sprayed on the alignment layer 12 to prop up the transparent conductive layer 22 according to the prior art. However, spacer balls from different purchasing batches, or even from a same purchasing batch, frequently have different diameters and volumes. Use of spacer balls 16 with diameters less then a height of the cell gap between the backplane 10 and the transparent conductive layer 22 often causes sliding of the spacer balls 16, leading to scratches on the surface of the alignment layer 12, and a flawed uniformity of the cell gap, leading to a defective thickness of the liquid crystal filled by the LC filling process, after the transparent conductive layer 22 is laminated on the backplane 10. The electrical performance of the LC panel is thus reduced.

SUMMARY OF INVENTION

It is therefore a primary object of the present invention to provide a method of fabricating a liquid crystal (LC) panel so as to prevent scratches on a surface of an alignment layer, as well as a cell gap between the alignment layer and a transparent conductive layer.

According to the claimed invention, a backplane comprises multiple arrayed electrodes. In the preferred embodiment of the invention, the alignment layer is coated on the backplane. By performing a rubbing process, multiple alignment trenches are formed on the alignment layer. A photoresist layer is then formed on the alignment layer. By performing a lithography process, a side frame, comprising at least one slit, and multiple photoresist spacers (PR spacers) are formed on the alignment layer. A curing process is then performed to reinforce hardnesses of both the PR spacers and the side frame, and a gasket seal is immediately coated on the side frame and the multiple PR spacers. By performing a lamination process,the transparent conductive layer is laminated on the backplane. A liquid crystal filling (LC filling) process is then performed to fill the cell gap between the backplane and the transparent conductive layer with liquid crystal. Finally, an end sealing process is then performed to seal the slit, and a realignment process is performed after the end sealing process.

It is an advantage against the prior art that the method provided in the present invention is applicable in manufacturing processes of liquid crystal on silicon (LCOS) panels as well as in producing liquid crystal display (LCD) panels. Production cost is thus reduced by this improvement. Additionally, the formation of the side frame and the multiple PR spacers, both having a same height and being adherent to the alignment layer, by performing the lithography process effectively prevents sliding of spacer balls, leading to fewer scratches on the surface of the alignment layer, and improves an uniformity of the cell gap between the backplane and the transparent conductive layer. A thickness uniformity of the liquid crystal filled by the LC filling process is thus ensured. Consequently, both the electrical performance and the reliability of the LC panel are significantly improved.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
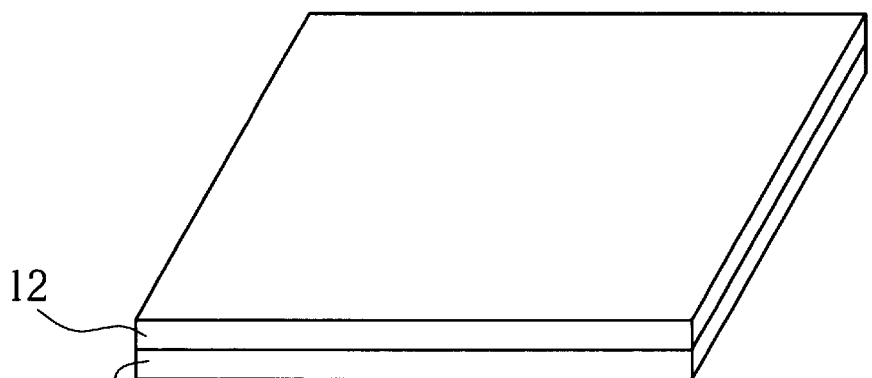
FIG. 1 to FIG. 5 are cross-sectional views of fabricating a liquid crystal (LC) panel according to the prior art.
Figure 2:
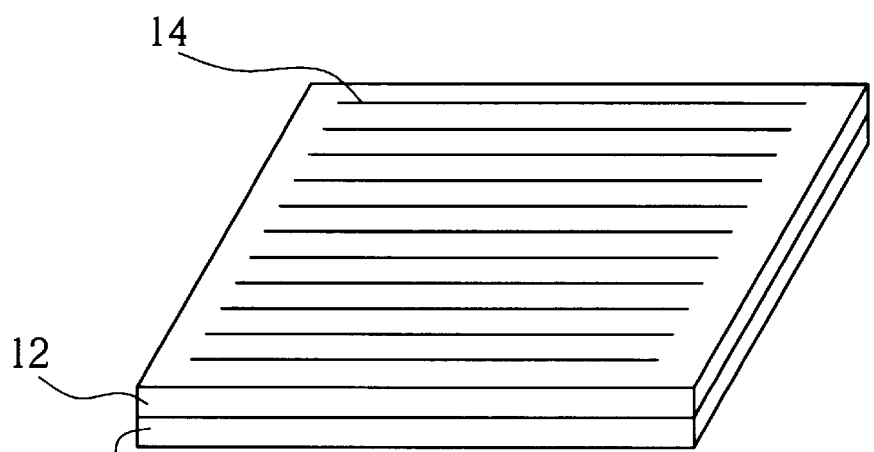
Figure 3:
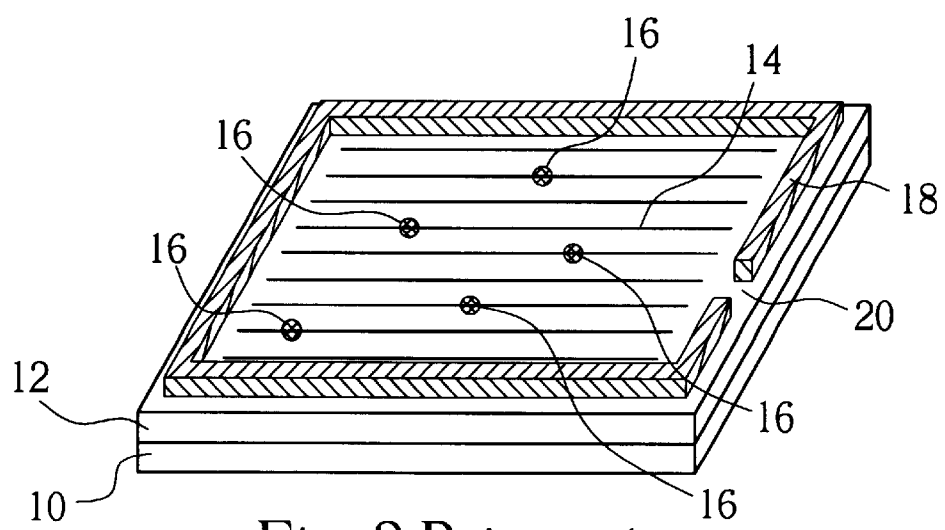
Figure 4:
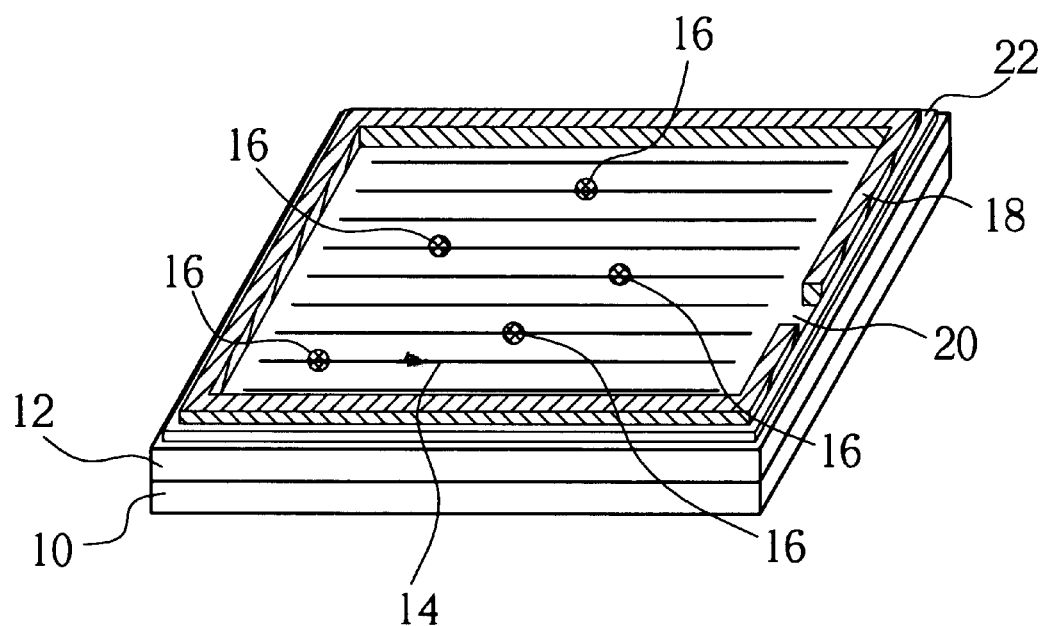
Figure 5:
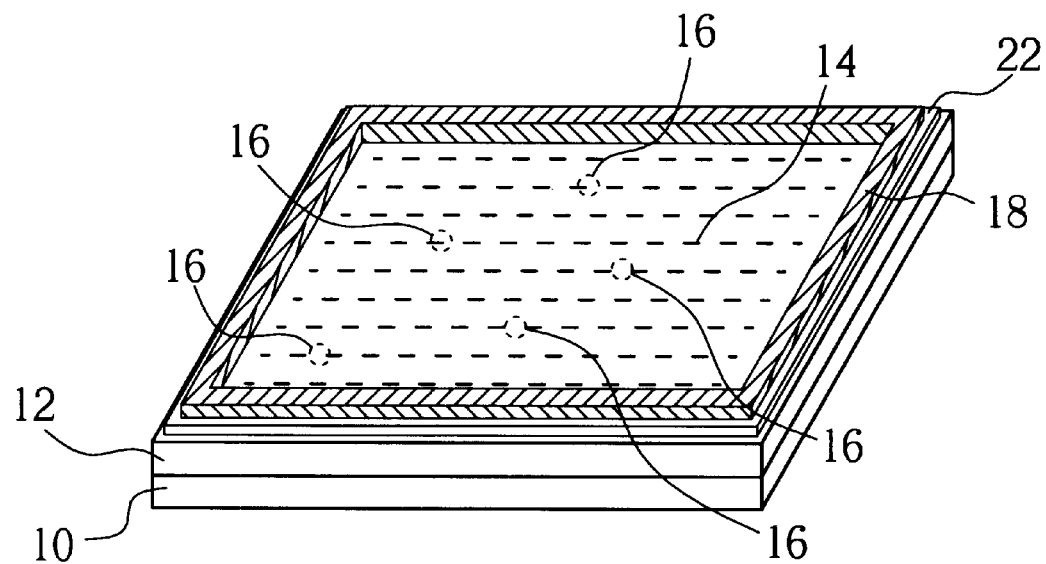
Figure 6:
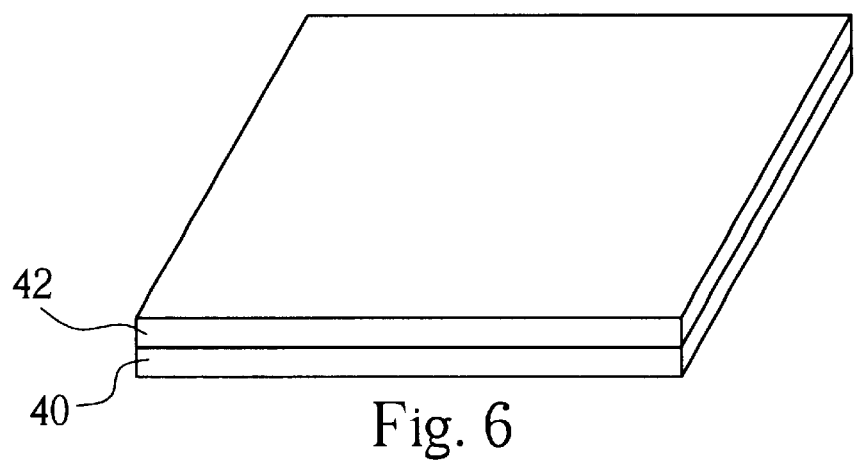
FIG. 6 to FIG. 10 are cross-sectional views of fabricating an LC panel according to the present invention.
Figure 7:
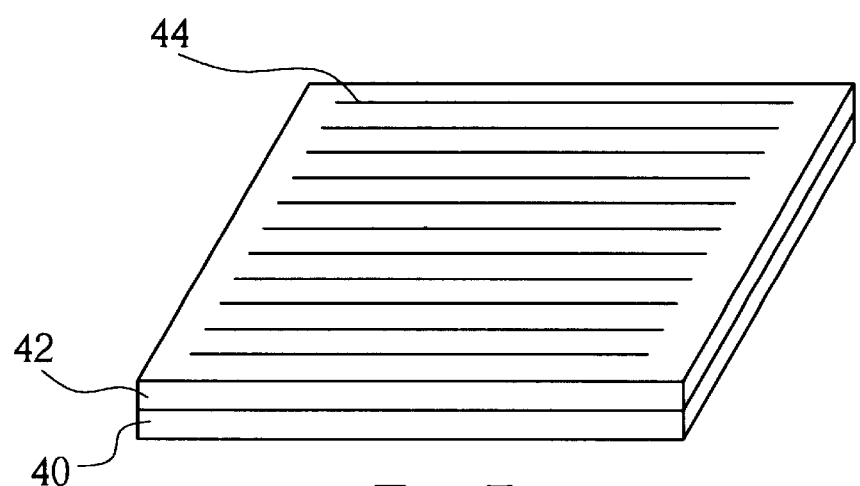

Please refer to FIG. 6 to FIG. 10 of cross-sectional views of fabricating a liquid crystal (LC) panel according to the present invention. As shown in FIG. 6, a backplane 40 comprises multiple arrayed electrodes (not shown) positioned on the backplane 40. The method begins with coating an alignment layer 42 on the backplane 40. As shown in FIG. 7, a rubbing process is performed to form multiple alignment trenches 44 on the alignment layer 42. Normally, the backplane 40 is a silicon backplane, and the rubbing process is performed on a surface of the alignment layer 42 and utilizes a rubbing cloth.

Figure 8:
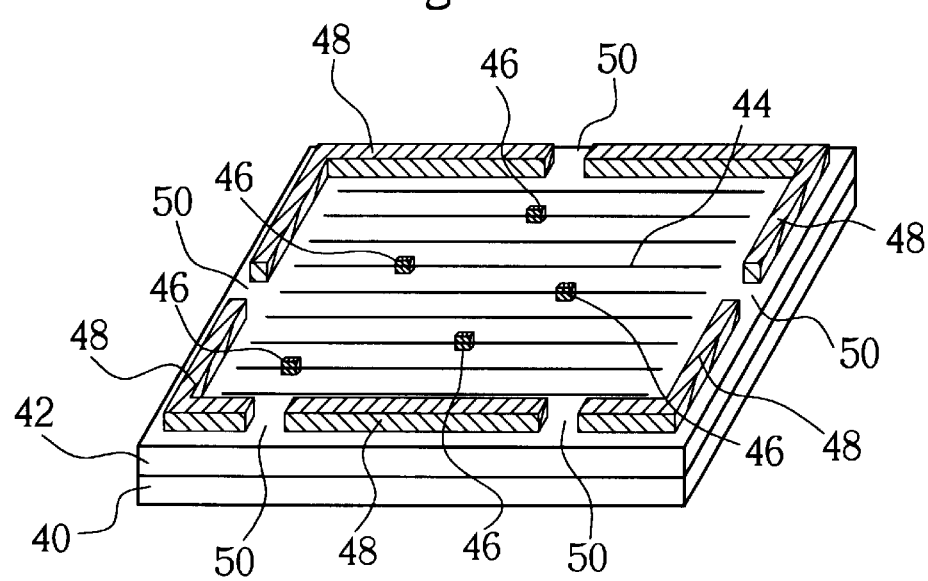

As shown in FIG. 8, a photoresist layer, comprising a photoresist with high transparency, is then formed on the alignment layer. By performing a lithography process, a side frame 48, comprising at least one slit 50, and multiple photoresist spacers (PR spacers) 46, the multiple PR spacers and the side frame 48 having a same height, are both formed on the alignment layer 42. Wherein a distance between two adjacent PR spacers 46 ranges from 200 to 400 microns, according to the product requirement, and the side frame 48 is a discontinuous frame positioned on a border of the backplane 40 and surrounds both the multiple electrodes and the multiple PR spacers 46.

Figure 9:
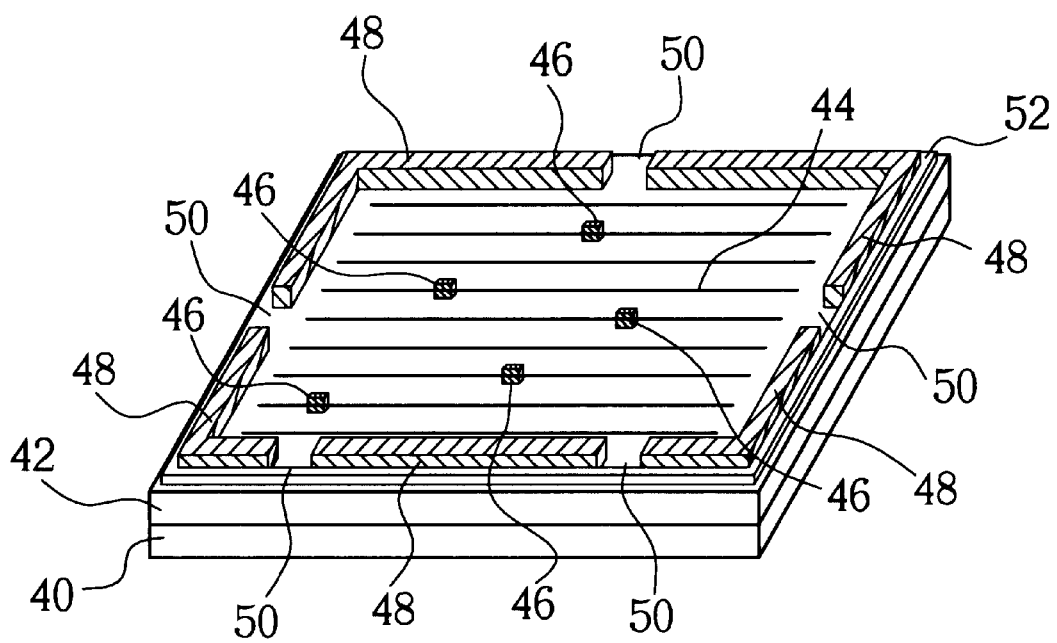

As shown in FIG. 9, a curing process is performed to reinforce hardnesses of both the PR spacers 46 and the side frame 48 so as to prevent a collapse of the PR spacers 46 or the side frame 48. Then, a gasket seal is coated on the side frame 48 and the multiple PR spacers 46. By performing a lamination process, a transparent conductive layer 52, comprising indium tin oxide (ITO), is laminated on the backplane 40, and a transparent glass (not shown) is laminated on a top surface of the transparent conductive layer 52. Optionally, an alignment film, comprising multiple alignment trenches, is formed on a bottom surface of the transparent conductive layer 52 before the lamination process is performed.

Figure 10:
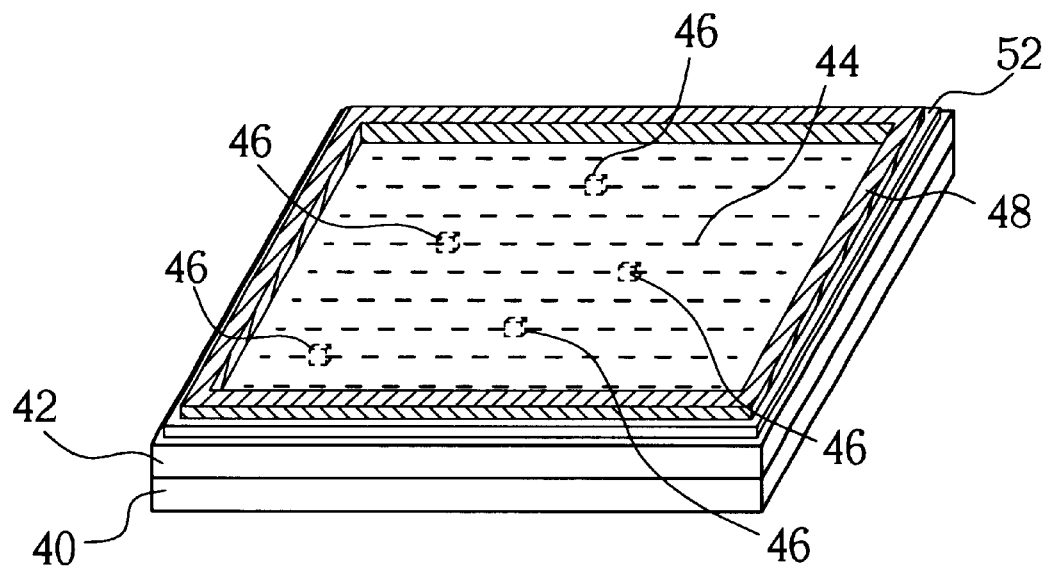

As shown in FIG. 10, a liquid crystal filling (LC filling) process is performed thereafter to fill a cell gap between the backplane 40 and the transparent conductive layer 52 with liquid crystal. Finally, an end sealing process is performed to seal the slit, and a realignment process is performed after the end sealing process.

In comparison with the prior art, the lithography process is performed to form the side frame 48 and the multiple PR spacers 46, both having a same height and being adherent to the alignment layer 42. Therefore, sliding of PR spacers 48, leading to scratches on the surface of the alignment layer 42, and a defective uniformity of the cell gap between the backplane 40 and the transparent conductive layer 52 are effectively prevented. A thickness uniformity of the liquid crystal filled by the LC filling process is thus ensured. Consequently, both the electrical performance and the reliability of the LC panel are significantly improved. In addition, the method provided in the present invention is applicable in manufacturing liquid crystal on silicon (LCOS) panels as well as in producing liquid crystal display (LCD) panels. Production cost is therefore reduced by this improvement.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A method of fabricating a liquid crystal (LC) panel, the method comprising:

providing a backplane comprising multiple arrayed electrodes;

coating an alignment layer on the backplane;

performing a rubbing process to form multiple alignment trenches on the alignment layer;

forming a photoresist layer on the alignment layer;

performing a lithography process to form on the alignment layer multiple photoresist spacers (PR spacers) and a side frame, the side frame comprising at least one alit;

performing a curing process to reinforce hardnesses of both the PR spacers and the side frame;

coating a gasket seal on the side frame and the multiple PR spacers;

performing a lamination process to laminate a transparent conductive layer on the backplane;

performing a liquid crystal filling (LC filling) process to fill a cell gap between the backplane and the transparent conductive layer with liquid crystal; and performing an end sealing process to seal the slit.

2. The method of claim 1 wherein the rubbing process is performed on a surface of the alignment layer and utilizes a rubbing cloth.

3. The method of claim 1 wherein the backplane is a silicon backplane.

4. The method of claim 1 wherein the photoresist layer comprises a photoresist with high transparency.

5. The method of claim 1 wherein the multiple PR spacers and the side frame have a same height.

6. The method of claim 1 wherein the side frame is a discontinuous frame positioned on a border of the backplane and surrounds the multiple electrodes and the multiple PR spacers.

7. The method of claim 1 wherein the transparent conductive layer comprises indium tin oxide (ITO).

8. The method of claim 1 wherein a realignment process is performed after the end sealing process.

9. The method of claim 1 wherein the LC panel is a liquid crystal on silicon (LCOS) panel.

10. The method of claim 1 wherein the LC panel is a liquid crystal display (LCD) panel.

11. A method of preventing PR spacer collapse in a LC panel, the method comprising:

providing a backplane comprising multiple arrayed electrodes;

coating an alignment layer on the backplane;

performing a rubbing process to form multiple alignment trenches on the alignment layer;

forming a photoresist layer with a high transparency on the alignment layer;

performing a lithography process to form on the alignment layer multiple PR spacers and a side frame, the side frame comprising at learnt one slit;

performing a curing process to reinforce hardnesses of both the PR spacers and the side frames;

coating a gasket seal on the side frame and the multiple PR spacers;

performing a lamination process to laminate a transparent conductive layer on the backplane;

performing a LC filling process to fill a cell gap between the backplane and the transparent conductive layer with liquid crystal; and performing an end sealing process to seal the slit;

wherein the PR spacers are formed after the rubbing process to prevent PR spacer collapse during the rubbing process.

12. The method of claim 11 wherein the rubbing process is performed on a surface of the alignment layer and utilizes a rubbing cloth.

13. The method of claim 11 wherein the backplane is a silicon backplane.

14. The method of claim 11 wherein the multiple PR spacers and the side frame have a same height.

15. The method of claim 11 wherein the side frame is a discontinuous frame positioned on a border of the backplane and surrounds the multiple electrodes and the multiple PR spacers.

16. The method of claim 11 wherein the transparent conductive layer comprises ITO.

17. The method of claim 11 wherein a realignment process is performed after the end sealing process.

18. The method of claim 11 wherein the LC panel is a LCOS panel or a LCD panel.

* * * * *